United States Patent Office 3,704,229
Patented Nov. 28, 1972

3,704,229
EPOXY RESIN CURING AGENT
Hiroji Tashiro and Tutomu Yamaguchi, Tokyo, Japan, assignors to Toka Shikiso Chemical Industry Co., Ltd., Tokyo, Japan
No Drawing. Filed Dec. 17, 1969, Ser. No. 885,974
Claims priority, application Japan, Dec. 26, 1968, 43/94,989
Int. Cl. C08f 45/72, 51/84
U.S. Cl. 252—182          5 Claims

ABSTRACT OF THE DISCLOSURE

A novel epoxy resin curing agent curable even in a wet state and having an improved compatibility with tar is prepared by adding acrylic acid ester as component A, to a mixture of at least one of slightly-water-soluble or unsoluble aliphatic amines having primary amines, as component B, and xylene diamine, as component C in the first stage reaction and amidizing one mole of terminal ester groups of said addition products with component C in the second stage reaction. The present curing agent is less toxic and a clear liquid low viscosity and a desired epoxy cured product can be obtained by mixing it with an epoxy resin by freely changing the mixing ratio.

---

This invention relates to a novel epoxy resin composition having room temperature curability, and to a novel epoxy resin curing agent sufficiently curable even in a wet state and having an improved compatibility with tar.

Heretofore, polyamines, their derivative and polyamide resins prepared by condensation of a polymeric fatty acid with polyamines have been used to cure the epoxy resin, but these substances are so hydrophilic that they are readily influenced with water. Consequently, there have been such drawbacks that the curing is considerably restrained at painting, lining, adhesion or the like under a high humidity. That is to say, polyamines and highly reactive polyamide resins are widely used as a curing agent for non-solvent type, epoxy coaltar paint, but the curing agent tends to absorb water and carbon dioxide in air owing to the influence of free amines and as a result, an amine brushing phenomenon is brought about. The coated film is thereby made sticky and a sufficiently cured product is hard to obtain. Furthermore, said curing agent has poor compatibility with epoxy resin at first stage and also poor compatibility with tar, and thus development of rainbow-like state and color change on the coated film are brought about and a commercial value thereof is considerably lowered.

Further, an epoxy composition containing a polyamine or a polyamide resin cannot be used in water or in a wetted state, because it dissolves in water.

An object of the present invention is to provide an excellent cured epoxy resin composition in which the above-mentioned drawbacks are overcome by the improvement of the curing agent.

The curing agent to be provided herein can be obtained by addition and condensation reactions of three components, A, B and C through steps which will be described in detail below:

Component A: An acrylic or methacrylic acid ester of such a structural formula as $CH_2=CRCOOR^1$, where R represents —H or —$CH_3$ and $R^1$ represents $C_nH_{2n+1}$ ($n$: 1–4).

Component B: One of slightly water-soluble or insoluble aliphatic amines having a primary amine radical or an amine mixture thereof, for example, 1,3-dimethylbutyl amine, 2-methyl-benzylamine, 2-ethylhexylamine, octylamine, olylamine, etc., and an aliphatic amine, and/or N-alkyl propylene diamine obtained by cyanoethylation and reduction of fatty amine having following general formula, $R-NH-(CH_2)_3-NH_2$, where R is an alkylene group of 16–18 carbon atoms, for example, N-coconut 1,3-propylene diamine, N-oleyl 1,3-propylene diamine (trade name: Duomeen C and Duomeen O made by Lion Armour, Ltd.), etc.

Component C: A xylylene diamine having such a structural formula as

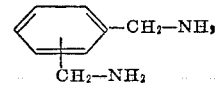

and having both properties of aliphatic amine and aromatic amine, and a 70:30 mixture of metaxylylenediamine and paraxylenediamine (trade name: Shoamine X–3000 made by Showa Denko, Ltd.)

Said three components A, B and C are used in the following manner:

(FIRST STAGE)

The components B and C having the primary amino radical are added to 1.0–1.3 mole of the component A having a double bond. In that case, 0.4–0.8 mole of the component B and 0.2–0.6 mole of the component C are used, where sum of the component B plus the component C is one mole.

When the component B is less than 0.4 mole, increase in viscosity is considerable and resistance to water is decreased. On the other hand, when the component B is more than 0.8 mole, curing is retarded and at the same time resistance to solvent becomes worse due to the decrease in grade of cross-linking.

The reaction is carried out by adding the component A dropwise to a mixture of the component B and the component C, to which a small amount of isopropyl alcohol is added as a polymerization inhibitor, over a period of 3 to 4 hours, while keeping a liquid temperature at 40–60° C., then elevating the mixture to a temperature of 90° C. over a period of 3 hours and keeping the mixture at that temperature for one hour to effect a sufficient addition reaction.

(SECOND STAGE)

0.8 to 1.0 mole of the component C is added to one mole of ester groups at the terminals of said addition products to effect amidation. In that case, when the component C is less than 0.8 mole, the viscosity is considerably increased and the curing is thereby inhibited extremely.

When the component C exceeds 1.0 mole, free amines remain as volatile matters and thus a wet curability becomes worse. In order to more completely finish the first stage, total refluxing is carried out for one hour after the component C has been added thereto, and then the temperature is slowly elevated to 230° C. During that period of operation, the solvent used as the inhibitor is recovered and dealcoholation by amidation is carried out. The desired product is obtained by keeping the product at that temperature for one hour after the completion of reaction.

The desired curing agent is obtained through said two-stage reactions.

The products obtained within these ranges all have a low toxicity and are low viscosity, water-white, clear liquids, and the desired, cured epoxy resin can be obtained by mixing it with a suitable epoxy resin while freely changing its mixing ratio.

As the epoxy resins curable by using said product of the present invention as curing agent, glycidyl ethers of such polyhydric phenols as bisphenol A, resorcinol, dihydroxy diphenylsulfone, 1,5-dihydroxynaphtharene, etc. or glycidyl ethers of such polyhydric alcohols as ethylene glycol, propylene glycol, etc. are preferable, but various features can be endowed by their respective mixtures.

The use of, particularly, a bisphenol A—epichlorohydrin condensate having an epoxy equivalent of 180–200 (trade name: Epikote 828 made by Shell Chemical), which is generally used, is suitable.

As the first feature of the present invention, a cured coated film having a good resistance to chemicals can be obtained in such unfavourable conditions as relatively low surrounding temperature (about 5° C.) and high humidity.

As the second feature, a good performance can be obtained when an epoxy-coaltar paint is prepared, because the present curing agent has a good compatibility with the epoxy resin from the beginning of mixing and further a good compatibility with tars.

As explained above, a composition of the curing agent-epoxy resin of the present invention has better properties than the conventional composition, but a diluent, filler, reinforcing agent, pigments, etc. can be further employed, if necessary.

The present invention will be explained specifically referring to examples which are offered by way of illustration but not by way of limitation. All parts are by weight.

Example 1

In a four-necked flask provided with a reflux cooler, a stirrer, a thermometer and a dropping funnel, were placed 108 parts of n-octylamine, 27.2 parts of xylylene diamine, and 25 parts of isopropyl alcohol under the atmosphere of nitrogen gas, and with stirring at 45~55° C., were dropped 100 parts of methyl methacrylate (including 2% MEHQ as a polymerization inhibitor) slowly from the dropping funnel over a period of three hours. After the completion of the dropping, the mixture was kept at the same temperature for about one hour and was heated to 90° C. over a period of three hours. Then, the mixture was kept at the same temperature for about one hour. Then, 136 parts of xylylene diamine was added to the mixture to effect further reaction, and the mixture was refluxed at 110–120° C. for about one hour.

The reflux cooler was replaced with a condenser provided with a side arm water trap, and the temperature was elevated to 230° to 240° C. while recovering isopropanol and effecting dealcoholation.

To complete the reaction, the mixture was kept at the same temperature for about one hour.

Yield: 299 parts, viscosity: 1500 cps. (25° C., BH type rotating viscometer)
Color number (Gardner-Heliger): 2
Amine value: 420

(The amine value is milligrams of potassium hydroxide in an equivalent amount to hydrochloric acid required to neutralize 1 g. of the product.)

Example 2

To the mixture of 51.6 parts of n-octyl amine, 74 parts of N-oleyl-1,3 propylene diamine and 54.4 parts of xylylene diamine, 107 parts of methyl methacrylate were added to the reaction mixture. Then, 125.1 parts of xylylene diamine were reacted with the reaction mixture in the same manner as in Example 1.

Yield: 360 parts
Viscosity: 1,000 cps. (25° C. BH type rotating viscometer)
Color number: 2
Amine value: 400

Example 3

To the mixture of 103.2 parts of 2-ethylhexyl amine, 27.2 parts of xylylene diamine and 50 parts of isopropyl alcohol, 104 parts of methyl methacrylate were added to react therewith. Then, 127.8 parts of xylylene diamine were reacted with the reaction mixture in the same manner as in Example 1.

Yield: 272 parts
Viscosity: 1,810 cps. (25° C., BH type rotating viscometer)
Color number: 2
Amine value: 418

Example 4

To the mixture of 77.4 parts of 2-ethylhexyl amine, 37 parts of N-oleyl-1,3 propylene diamine, 40.8 parts of xylylene diamine and 50 parts of isopropyl alcohol, 105 parts of methyl methacrylate were added to react therewith. Then, 128 parts of xylylene diamine were reacted with the reaction mixture in the same manner as in Example 1.

Yield: 317 parts
Viscosity: 1,730 cps. (25° C., BH type rotating viscometer)
Color number: 4
Amine value: 405

Example 5

The products synthesized according to Examples 1–4 were subjected to performance tests:

(I) ADHESION STRENGTH (TENSILE SHEARING STRESS)

Test piece: mild steel plate (sand blast-treated)
Curing time: 4 days
Testing condition: 25° C., 65% RH
Size of bonding area: 20 x 10 mm.
Epoxy resin use: Bisphenol type resin (Epikote 828, supplier, Shell Chemical)

(1) Adhesion strength in the case where no coaltar was added:

| Epoxy resin/ curing agent | Example 1 (kg./cm.²) | Example 2 (kg./cm.²) | Example 3 (kg./cm.²) | Example 4 (kg./cm.²) |
|---|---|---|---|---|
| 5:5 | 136 | 81 | 135 | 133 |
| 6:4 | 105 | 100 | 106 | 110 |
| 7:3 | 115 | 120 | 110 | 107 |
| 8:2 | 140 | 141 | 120 | 125 |

(2) Adhesion strength in the case where coaltar was added: (Coaltar was mixed with the same amount of total resin:)

| Epoxy resin/ curing agent | Example 1 (kg./cm.²) | Example 2 (kg./cm.²) | Example 3 (kg./cm.²) | Example 4 (kg./cm.²) |
|---|---|---|---|---|
| 5:5 | 64 | 65 | 64 | 61 |
| 6:4 | 116 | 109 | 119 | 126 |
| 7:3 | 141 | 132 | 145 | 149 |
| 8:2 | 150 | 139 | 149 | 157 |

(3) Adhesion strength in the case of curing in water: (Samples were cured in water for one week after resins are applied to iron pieces:)

| Epoxy resin/ curing agent | Example 1 (kg./cm.²) | Example 2 (kg./cm.²) | Example 3 (kg./cm.²) | Example 4 (kg./cm.²) |
|---|---|---|---|---|
| 5:5 | 126 | 71 | 124 | 117 |
| 6:4 | 98 | 97 | 100 | 101 |
| 7:3 | 109 | 105 | 102 | 99 |
| 8:2 | 131 | 127 | 109 | 110 |

(II) PAINT TEST

Coated film state was tested by changing test conditions using the products of Examples 1 to 4 as a curing agent for coaltar epoxy paint:

Test condition
(1) Mixing:           Parts
    Epoxy resin (Bisphenol type resin; Epikote 828) _____ 60
    Curing agent (products of Examples 1 to 4 and polyamide resin) _____ 40
    Coaltar (Tarclon 180 made by Yoshida Seiyusho) _____ 100

Test condition—Continued

Parts

Curing accelerator (tris (dimethyl-amino-methyl) phenol; DMP-30 made by Rohm and Haas) ........................................ 1.5

(2) Test plate:
Tin plate defatted and washed with toluol-methylethylketone mixture.

(3) Ageing time:
30 minutes (main ingredient and curing agent are to be mixed 30 minutes before painting)

(4) Coating times and film thickness:
Coating times: one
Film thickness: 36μ

(5) Curing conditions:
7 days' curing at room temperature in air.
7 days' curing at room temperature and high humidity (95% relative humidity).
7 days' curing at room temperature in water.

Various curing characteristics were evaluated under the above conditions:

Test result (a) Coated film state:

| Curing condition | Room temperature in air | Room temperature at high humidity | Room temperature in water |
|---|---|---|---|
| Example 1 | 0 | 0 | Δ |
| Example 2 | 0 | 0 | 0 |
| Example 3 | 0 | Δ | Δ |
| Example 4 | 0 | 0 | 0 |
| Commercially available polyamide [1] | 0 | X | X |

[1] Commercially available polyamide is a polyamide of polymeric acid and aliphatic amine having an amine value of 400.

NOTE:
0: No occurrence of abnormal state.
Δ: Partial occurrence of abnormal state.
X: Very bad, occurrence of whitening phenomenon.

(b) Physical test of coated film.—Erichsen test, crosscutting test and impact test (Du Pont) of the coatings were carried out:

| | Example | Room temperature in air | Room temperature at high humidity | Room temperature in water |
|---|---|---|---|---|
| Erichsen test | 1 | 0 | 0 | 0 |
| | 2 | Δ | Δ | Δ |
| | 3 | 0 | 0 | Δ |
| | 4 | Δ | 0 | 0 |
| Crosscutting test | 1 | 0 | 0 | 0 |
| | 2 | 0 | 0 | 0 |
| | 3 | 0 | 0 | 0 |
| | 4 | 0 | 0 | 0 |
| Du Pont test | 1 | 0 | 0 | 0 |
| | 2 | 0 | 0 | 0 |
| | 3 | 0 | 0 | 0 |
| | 4 | 0 | 0 | 0 |

NOTE.—Δ and 0 have the same meaning in (a).

(III) CURABILITY UNDER WET STATE

Concrete mortar pieces shaped according to JIS R-5201 size of test piece: 4 x 4 x 16 cm. were cured in water for one month, and the pieces were bonded in a wet state with a composition of epoxy resin and the products of Examples 1 to 4 and immediately dipped in water. After they were left in water for one week, the bending strength test was carried out. The mixing ratio of Epikote No. 828 to the products of Examples 1 to 4 was 60:40. In the bending strength test, all the mortar pieces were destructed, but no change took place at the bonded part.

JIS R5201 (PHYSICAL TESTING METHODS OF CEMENT)

(10) Strength test (10.1) Method for preparing samples.—The strength of cement is decided by bending test and compression test. As the sample for bending test, a prism having a cross-sectional area of 40 mm.² and a length of 160 mm. is used, and as the sample for compression test, two broken pieces of the sample used for bending test are used.

As the sample for bending test, three pieces are simultaneously prepared according to the following method:

520 g. of cement and 1040 g. of standard sand are correctly weighed; they are put in a bowl and mixed for two minutes using a spoon; 338 g. of water is then added thereto and they are kneaded for three minutes and mixed well; and the resultant mortar is filled into 3 molds in two layers according to the following method:

The mortar is at first filled up to about half of the height of each mold; the filled mortar is prodded by means of a prod all over the total surface to such an extent that the top end of the prod enters into the mortar by about 4 mm.; additional mortar is then filled up to the upper end of each mold, and prodded by means of a prod as in the previous manner; and finally, the remaining mortar is increased by about 5 mm. over the mold.

As for the prodding times, those shown in the following table are made standard in accordance with the results of flow test described in the item 10.5.

Range of flow value:
Below 169 .................................. 20
170–199 .................................. 15
200–209 .................................. 10
Above 210 .................................. 5

Prodding times

The mold must be used after it is coated with grease, closed with bolts and ascertained that no leakage of water occurs.

More than 5 hours after filling with mortar, the rise of the mortar over the mold is scraped off with attention so as not to injure the sample; and the upper surface is made smooth by light rubbing without pushing.

More than 20 hours after filling, the material is released carefully off the mold.

The above-mentioned kneading, filling, surface-finishing and releasing from the mold are always carried out indoors; direct exposure to sunlight is avoided to prevent drying; after filling, the material is placed in a humid box and temperature change and air ventilation are prevented; and after 24 hours, it is put in a water tank and soaked thoroughly in water.

We claim:
1. A two-stage method of preparing an epoxy resin curing agent capable of effecting sufficient curing in wet state and having an improved compatability with tar which comprises:

(I) in a first stage adding 1.0–1.3 mole of a component A comprising an acrylic acid ester represented by the formula $CH_2=CROOR^1$ wherein R is H or $CH_3$
$R^1$ is $C_nH_{2n+1}$
$n=1$ to 4 to a mixture of (a) 0.4–0.8 mole of a component B comprising at least one aliphatic amine having a primary amine radical and selected from the group consisting of 1,3-dimethylbutylamine, 2-methylbenzylamine, 2-ethylhexylamine, octylamine, oleylamine, N-coconut, 1,3-propylene diamine and N-oleyl-1,3äpropylene diamine, and (b) 0.2–0.6 mole of a component C comprising xylylene diamine having the structural formula

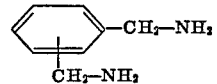

in such a range that the sum of the components B and C is one mole and (II) in a second stage reaction amidizing one mole of terminal ester groups of said addition products with 0.8 to 1.0 mole of the component C.

2. A method according to claim 1 wherein component B is n-octylamine.

3. A method according to claim 1 wherein component B is N-oleyl-1,3-propylenediamine.

4. A method according to claim 1 wherein component B is 2-ethylhexylamine.

5. A method according to claim 1 wherein component A is methylmethacrylate.

References Cited

UNITED STATES PATENTS

| | | | |
|---|---|---|---|
| 3,107,226 | 10/1963 | Tonner et al. | 260—47 EPCN |
| 3,247,163 | 4/1966 | Reinking | 260—47 EN |
| 3,337,609 | 8/1967 | Williamson et al. | 260—47 EN |

LEON D. ROSDOL, Primary Examiner

I. GLUCK, Assistant Examiner

U.S. Cl. X.R.

260—2 EN, 47 EN, 482 P, 486 R